United States Patent Office 3,761,457
Patented Sept. 25, 1973

3,761,457
PROCESS FOR BETA-PINENE-DIPENTENE
COPOLYMERS
Herbert George Arlt, Jr., Ridgefield, and Erwin Richard
Ruckel, Darien, Conn., assignors to Arizona Chemical
Company, New York, N.Y.
No Drawing. Filed July 2, 1971, Ser. No. 159,510
Int. Cl. C08f 7/02, 19/02
U.S. Cl. 260—88.2 C                    12 Claims

ABSTRACT OF THE DISCLOSURE

A process is given for preparing polyterpene resins by adding catalyst to a small amount of monomer solvent solution, adjusting the temperature, and subsequently adding the monomer feed at a controlled rate until the desired polyterpene resins are formed.

---

This invention relates to an improved process for the preparation of polyterpene resins. More particularly, this invention relates to an improved process for preparing polyterpenes based on polymerizations where dipentene is employed as monomer and the polymerization medium is an aromatic solvent.

Terpene polymers are well known in the art for use in compositions applied as hot-melt coatings or adhesives and as pressure-sensitive adhesives. The properties of specific terpene polymers vary widely and specific utility, i.e., hot-melt or pressure-sensitive applications, depends upon specific polymer properties. Hot-melt coatings, for example, should provide after cooling a smooth, clear coating which does not exude resin and is not tacky, adhering only to the surface upon which it is coated. A pressure-sensitive adhesive, on the other hand, must remain aggressively tacky and contactably adhesive in use.

Conventionally, polyterpenes used in hot-melt or pressure-sensitive applications are homopolymers of dipentene or β-pinene, respectively. Dipentene homopolymers provide high compatibility, excellent gloss, and low water vapor transmission to hot-melt coatings and, accordingly, are preferred in such application. Generally, their low shear and excessive tack render them unsuitable for use as pressure-sensitive adhesives. β-Pinene homopolymers, on the other hand, provide optimum tack and shear strength in pressure-sensitive adhesives and are preferred in such application. Their lower compatibility and higher water vapor transmission render them unsuitable for hot-melt coatings. Blends of homopolymers reflect the poorest properties of individual components in specific applications and result in inferior adhesives. A significant increase in use of pressure-sensitive adhesives has resulted in a short supply of β-pinene homopolymers.

β-Pinene is a natural product, occurring as a minor component of turpentine. Hackh's Chemical Dictionary, McGraw-Hill Book Company, New York, N.Y. U.S.A., 4th edition (1969), p. 697, gives the following compositions (in percentages):

| Terpene | Gum turpentine | Wood turpentine | Sulfate turpentine |
| --- | --- | --- | --- |
| α-Pinene | 60-65 | 75-80 | 60-70 |
| β-Pinene | 25-35 | Nil | 20-25 |
| Camphene |  | 4-8 |  |
| Other terpenes | 5-8 | 15-20 | 6-12 |

Dipentene may either be a natural product, commonly known as limonene, or may be obtained synthetically by isomerization of α-pinene.

With respect to reactivity in polymerizations β-pinene is readily active whie dipentene is relatively inactive. In polymerization, β-pinene which has the structure

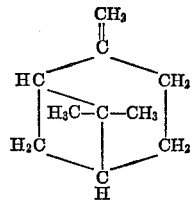

is reported, JACS, 72 (1950), pp. 1226–1230, to provide a polymer having the recurring unit

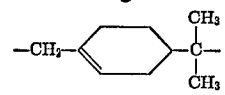

Dipentene, on the other hand, which has the structure

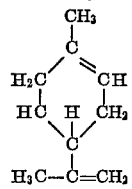

appears to polymerize both through the exocyclic and ring double bonds, resulting in a hydrocarbon backbone which contains crowded pendant rings as well as macrocyclic rings. These distinct polymer structures are thought to be responsible for differences in homopolymer properties observed and to result in the selective utility with respect to hot-melt and pressure-sensitive adhesives.

Recent studies have indicated that certain terpenes can be copolymerized with one another as well as with monomers outside the class designated as terpenes. Certain of the copolymers provide advantages in applications over corresponding mixtures of homopolymers. Because of the limited availability of β-pinene and the increased demands for polyterpenes based on this monomer, the development of useful copolymers which reduce requirements for β-pinene help to satisfy the increased demands. Additionally, improved polymerization techniques which can result in improved polyterpenes of reduced β-pinene requirements are highly desirable advances in the technology of terpene resins.

Polymerization of terpenes, once initiated, are generally highly exothermic in nature. Such nature leads to difficulties in control of the reaction and tends to rule out the possibility of bulk polymerizations. Conventionally, the polymerizations are carried out in solution with monomer added gradually to the solvent-catalyst medium. Even under such conditions, external cooling is necessary along with controlled monomer addition in order to control the reaction. The limitations of the process are such as to lead to a balance of polymer yield, composition, and properties that leaves much to be desired and, consequently, improved processes that will lead to a better balance of polymer yield, composition and properties are constantly sought.

Polyterpenes prepared in an aromatic hydrocarbon solvent employing a monomer feed which contains dipentene, in particular, result in an unfavorable balance of polymer yield, composition, and properties. This result is due to side reactions involving activated monomers or growing polymer chains. As a result of such side reactions, which include solvent initiation and termination, an aromatic hydrocarbon moiety derived from solvent is introduced into the polymer chain. Such introduction is undesirable in that it interferes with obtaining polymers of high molecular weight and adds as an internal plasticizer the aromatic hydrocarbon moiety, which results in low softening point of the polymer obtained. The side reactions in the case of dipentene apparently are associated with the relative inactivity of dipentene in polymerizations, resulting in relatively high solvent side reaction. Thus, the abundance of relatively low molecular weight polymer fractons obtained in dipentene polymerizations in aromatic hydrocarbon solvents as well as the high content of aromatic hydrocarbon moieties introduced into such polymers require extensive steam stripping of the polymerization products in order to provide polyterpenes of properties desirable for many uses. The excessive requirements for time and steam as well as excessive losses in yield associated with steam stripping of dipentene polymerizations point out the need for improved polymerization processes with respect to dipentene monomer.

In accordance with the present invention, there is provided an improved process for preparing polyterpenes in an aromatic hydrocarbon solvent wherein dipentene is present in the monomer feed which comprises: adding to said solvent from about 0.5% to about 5.0%, by weight, of at least one monomer present in said monomer feed, said percentages being based on the total weight of monomer feed; adding to the resulting monomer solution from about 1% to about 5%, by weight, of a Friedel-Crafts catalyst, the percentages based on the total weight of monomer feed; adjusting the temperature of the catalyzed monomer solution thus obtained so as to be in the range of 30° C to 65° C.; adding said monomer feed to the reaction mixture thus obtained at a rate which will maintain the reaction temperature within the range specified in the presence of external cooling; continuing said monomer addition until the reaction mixture contains between about 20% to 70% of solids resulting from monomer addition, said percentages being by weight, based on the total weight of solvent and monomer added; maintaining the reaction mixture at a temperature in the specified range for a period of time after complete monomer addition sufficient to ensure substantial utilization of monomer; and thereafter recovering the polyterpene thus obtained.

The process of the present invention provides polyterpenes containing recurring dipentene monomer units which have reduced contents of aromatic hydrocarbon moieties, have higher molecular weight averages, have higher melting points, and, upon steam distillation, result in lower losses of yield in comparison to corresponding polyterpenes produced by conventional polymerization procedures.

In carrying out the process of the present invention, it is necessary that the solvent medium used in the polymerization be an aromatic hydrocarbon. Suitable solvents include benzene, toluene, p-xylene, mixed xylenes and ethyl benzene. The amount of solvent employed is such as to provide a final reaction mixture which contains from about 20% to about 70% of polymerization products, by weight, based on the total weight of polymerization product and solvent. Lower solvent usage can result in viscosity problems while higher solvent usage is unnecessary and wasteful.

As monomer feed to be used in the process of the present invention, it is necessary that dipentene be present. Dipentene may be substantially the only monomer present in the feed or there may be present dipentene in admixture with one or more other monomers copolymerizable therewith. Since the process produces polyterpenes, it is necessary that the content of terpene monomers in the feed constitute a major portion thereof, i.e. at least 50% by weight of the total weight of monomers. However, to show an improvement in polyterpenes produced by the process of the present invention, as little as 10% or more, by weight, of dipentene need be present in the monomer feed. Particularly good results are obtained when dipentene makes up 25% or more of the monomer feed, and results continue to be increasingly beneficial as the content of dipentene in the monomer feed increases. A specific utility of the process of the present invention is in the preparation of homopolymers of dipentene and in copolymers of dipentene with other terpenes, especially dipentene-β-pinene copolymers. However, it is also applicable to dipentene copolymers with, for example, styrene, divinylbenzene, and other monomers added in minor proportions to modify the basic properties of the polyterpenes. Similarly, copolymers of dipentene, β-pinene and one or more additional monomers in minor proportions are also beneficially prepared by the process of the present invention. Accordingly, the monomer feed should consist in the majority proportion of terpenes, of which at least some dipentene is present, and may contain as a minority portion, one or more additional monomers not of the terpene genus. The total amount of monomer feed will be such as to form a polymerization product which represents 20% to 70%, by weight, of polyterpene, based on the total weight of polyterpene and solvent.

The critical step of the present process is that of preparing the initial reaction mixture. In preparing such mixture, it is necessary to add from about 0.5% to 5.0%, by weight, based on the total weight of monomer feed, of at least one monomer present in the monomer feed to the total quantity of solvent to be taken. When dipentene is the only monomer present, the monomer added to the solvent necessarily is dipentene. When dipentene and other monomers constitute the monomer feed, the portion of monomer feed initially added to the solvent may be the proper proportion of monomer mixture or the proper proportion of any one or more of the monomers making up the monomer mixture. Thus, although improvements in polymerizations in which dipentene is present are obtained, it is not necessary that dipentene be initially added to the solvent medium unless dipentene constitutes the sole monomer in the monomer feed. The minimum amount of monomer that can initially be added to the solvent and obtain desired improvements appears to be about 0.5%, by weight, based on the total monomer feed. Lower amounts do not appear to lead to detectable improvements. The absolute maximum amount of monomer that can be added appears to be about 5%, same basis. Addition of higher amounts of monomer in forming the initial reaction mixture generally results in uncontrollable exotherms during the course of polymerization and, accordingly, are to be avoided because of adverse effects of such exotherms on the desired balance of polymer yield, composition, and properties and operational safety. Preferably, the amount of monomer added initially to the solvent is between 1% and 3%, more preferably between 2% and 3%, by weight, based on the total weight of monomer feed.

Once the initial addition of monomer to solvent has been made and solution effected, the next step in the process of the present invention is to add from about 1% to about 5%, by weight, of a Friedel-Crafts catalyst to the initial monomer solution, the percentage being based on the total weight of monomer feed. Friedel-Craft catalysts useful in terpene polymerizations are well known and any of such useful catalysts may be employed. Suitable catalysts include, for example, aluminum chloride, boron trifluoride, zirconium chloride, aluminum bromide, boron trifluoride-ethyl ether complex, and the like. Catalyst usage is preferably about 2% to 3%, by weight, based on the total weight of monomer.

Once the catalyst has been added, the reaction medium is brought to a temperature in the range of about 30° C. to 65° C. Since the polymerization reaction is exothermic in nature, it is generally unnecessary to apply heat to obtain the temperature desired. It is necessary to have an external cooling source available to prevent excessive temperature rises. Temperatures below about 30° C. do not lead to efficient polymerization while temperatures above about 65° C. generally lead to low molecular weight polymers of narrow molecular weight distribution. When the reaction mixture has obtained the temperature desired, control of the temperature is effected by use of the external cooling source and by continuous monomer addition at a rate which maintains the desired temperature.

When the initial reaction mixture has obtained the desired temperature, monomer addition is then continued until sufficient monomer has been added to produce from about 20% to about 70%, by weight, of polymer based on the total weight of polymer and solvent. Lower solvent usage can cause viscosity problems while higher solvent is unnecessary and wasteful. The time duration of monomer addition will be influenced by the nature of the equipment employed and the ability to maintain the reaction temperature therewith.

After monomer addition is complete, maintenance of reaction temperature is necessary to obtain substantial utilization of monomer. A time period of from about 15 to 60 minutes is adequate for this purpose. Shorter time periods tend to be inadequate and longer time periods are unnecessary.

Recovery of the copolymer from the reaction mixture may be by any suitable procedure. Distillation or evaporation of solvent at atmospheric or sub-atmospheric pressure is a convenient procedure. Generally, after an initial distillation to remove the bulk of solvent, a subsequent steam distillation is employed to remove the last traces of solvent. In addition, when desired, the polymer may be dehydrohalogenated in accordance with conventional procedures. Several such procedures are described in U.S. Pats. Nos. 2,555,255 and 2,555,221 both patented May 29, 1971 and No. 3,297,673 patented Jan. 7, 1967.

It is generally preferable just prior to polymer recovery to remove catalyst materials from the reaction mixture. This is conveniently done by aqueous acid extraction of the reaction mixture. Additional water washing is then effected to remove the acid. Catalyst removal tends to minimize adverse effects during subsequent polymer recovery.

The invention is illustrated by the examples which follow, in which all parts and percentages are by weight unless otherwise specifically designated.

EXAMPLE 1

500 parts of p-xylene were charged to a kettle and stirring was initiated. To the xylene were then added 18 parts of a monomer mixture constituting 51% β-pinene and 49% dipentene. To this solution were then added 18 parts of anhydrous aluminum chloride. The catalyzed reaction mixture was allowed to achieve a temperature of 45° C. and cooling was then provided to maintain the temperature at 45° C. Addition of the remaining 582 parts of the same monomer mixture was then initiated and the rate of addition was such as to maintain the reaction mixture at 45° C. After 10% of the monomer feed had been added, a sample of the reaction mixture was taken so as to determine properties of the first 10% of polymer formed. After monomer addition was complete, about 1 hour, the reaction mixture was maintained at 45° C. for 30 minutes. The aluminum chloride was then removed by washing the xylene solution with 2% aqueous hydrochloric acid followed by deionized water washes until the wash water was neutral. The xylene was then removed by vacuum distillation. Yield of polymer was 95–98%. Work-up of the sample of the first 10% of polymer formed was the same as for the balance of the run. Properties of the polymer are given in Table I.

COMPARATIVE EXAMPLE A 500 parts of p-xylene were charged to a kettle and stirring was initiated. To the xylene were added 18 parts of anhydrous aluminum chloride. Addition of 600 parts of a monomer mixture constituting 51% β-pinene and 49% dipentene was then begun. When the reaction mixture reached a temperature of 45° C., external cooling was initiated. The balance of monomer was then added at a rate which maintained the temperature at 45° C. in conjunction with the external cooling. After 10% of monomer had been added, a sample of the reaction mixture was taken so as to determine properties of the first 10% of polymer formed. After monomer addition was complete, about one hour, the reaction mixture was maintained at 45° C. for 30 minutes. Polymer recovery and work-up of the sample of the first 10% of polymer formed was as in Example 1. Yield of polymer was 95–98%. Properties of the polymer are also given in Table I.

TABLE I.—POLYMER PROPERTIES

| | Softening point, ° C.[1] | Number average, molecular weight | Aromatic MER (percent)[2] |
|---|---|---|---|
| Final polymer: | | | |
| Example | 108 | 850 | |
| Comp. Example A | 105 | 820 | |
| First 10% of polymer formed: | | | |
| Example | 90 | 795 | 5, 8 |
| Comp. Example A | 65 | 595 | 14, 4 |

[1] Ring and Ball Method, ASTM E 28-58%.
[2] Aromatic hydrocarbon moieties per 100 terpene monomer units. Calculated from nuclear magnetic resonance spectra.

The data in Table I show the improved properties of polymers obtained by the process of the present invention. Increases in molecular weight and softening point and reduction in aromatic hydrocarbon moieties in the polymer are especially evident in the first 10% of polymer formed. The improved nature of the first 10% of polymer formed is reflected in the final polymer obtained.

EXAMPLE 2

The procedure of Example 1 was followed in every detail except that the monomer mixture employed constituted 25% β-pinene and 75% dipentene. Polymer properties are given in Table II. Polymer yield was 95%.

COMPARATIVE EXAMPLE B

The procedure of Comparative Example A was followed in every material detail except that the monomer mixture constituted 25% β-pinene and 75% dipentene. Polymer properties are given in Table II. Polymer yield was 95%.

TABLE II.—POLYMER PROPERTIES

| | Softening point, ° C.[1] | Number average, molecular weight | Aromatic MER (percent)[2] |
|---|---|---|---|
| Final Polymer: | | | |
| Example 2 | 97 | 630 | |
| Comp. Example B | 88 | 560 | |
| First 10% of polymer formed: | | | |
| Example 2 | 88 | 565 | 4, 9 |
| Comp. Example B | 66 | 520 | 10, 9 |

See footnotes 1 and 2 in Table I.

The data in Table II show the improved properties of polymers obtained by the process of the present invention. The improved nature of the first 10% of polymer formed again reflects in the final polymer obtained.

EXAMPLE 3

The procedure of Example 1 was again followed in every material detail except that the monomer mixture employed constituted 5% β-pinene and 95% dipentene. Polymer yield was 95%. Polymer properties are given in Table III.

COMPARATIVE EXAMPLE C

The procedure of Comparative Example A was again followed in every material detail except that the monomer mixture constituted 5% β-pinene and 95% dipentene.

Polymer yield was 95%. Polymer properties are given in Table III.

TABLE III.—POLYMER PROPERTIES

| | Softening point, °C.[1] | Number average, molecular weight | Aromatic MER (percent)[2] |
|---|---|---|---|
| Final polymer: | | | |
| Example 3 | 90 | 575 | |
| Comp. Example C | 80 | 555 | |
| First 10% of polymer formed: | | | |
| Example 3 | 80 | 550 | 9.2 |
| Comp. Example C | 50 | 454 | 16.0 |

See footnotes 1 and 2 in Table I.

EXAMPLE 4

The procedure of Example 1 was followed in every material detail except that the monomer employed in preparing the initial reaction mixture was solely dipentene. A polymer was obtained in 95% yield which possessed substantially the same properties as that of Example 1.

EXAMPLE 5

The procedure of Example 1 was followed in every material detail except that the monomer employed in preparing the initial reaction mixture was solely β-pinene. A polymer was obtained in 95% yield which possessed substantially the same properties as that of Example 1.

As employed in this specification, it is readily seen that monomer feed is intended to include not only monomer that is used in preparing this initial reaction mixture, but in addition is intended to include monomer added as subsequent feed.

EXAMPLE 6

The procedure of Example 1 was followed in every material detail except that 3% of β-pinene was used in preparing the initial reaction mixture and the remaining monomer was dipentene. The polymer was obtained in 95% yield and showed improved properties over the prior art polymer prepared from a similar feed in accordance with Comparative Example A.

What is claimed is:

1. An improved process for preparing polyterpenes in an aromatic hydrocarbon solvent wherein at least 50 wt. percent of terpene monomer, with at least 10 wt. percent dipentene is present in the monomer feed, said process comprising: adding to said solvent from about 0.5% to about 5.0% by weight of at least one monomer present in said feed, said percentage being based on the total weight of monomer feed; adding to the monomer solution thus formed from about 1% to about 5% by weight of a Friedel-Crafts catalyst, said percentage based on the total weight of monomer feed and after adding the entire catalyst charge adjusting the temperature of the catalyzed monomer solution to a value within the range of 30° C. to 65° C. and adding the remainder of monomer feed to the catalyzed monomer solution at a rate which will maintain the temperature within the range specified in the presence of external cooling and continuing said monomer addition at said rate until the solution contains between about 20% and about 70% of added monomer, said percentage being by weight based on the total weight of added monomer and solvent and holding the solution at the reaction temperature after complete monomer addition for a time sufficient to ensure substantial utilization of monomer; and thereafter recovering the polyterpene thus formed.

2. The process of claim 1 wherein the monomer feed consists of β-pinene and dipentene in respective weight ratios of 19:1 to 1:19.

3. The process of claim 1 wherein the monomer added prior to catalyst addition is dipentene.

4. The process of claim 2 wherein the monomer added prior to catalyst addition is the same as that added subsequent to catalyst addition.

5. The process of claim 1 wherein the catalyst is aluminum chloride.

6. The process of claim 1 wherein the solvent is p-xylene.

7. The process of claim 1 wherein the reaction temperature is about 45° C.

8. The process of claim 1 wherein just prior to recovery of the polyterpene the catalyst is extracted from the polymer solution.

9. The process of claim 8 wherein the polyterpene is recovered by vacuum distillation of solvent therefrom.

10. The process of claim 1 wherein the recovered polyterpene is dehydrohalogenated.

11. The process of claim 1 wherein the monomer added prior to catalyst addition is styrene.

12. The process of claim 1 wherein the monomer added prior to the catalyst addition is β-pinene.

References Cited

UNITED STATES PATENTS

| 2,567,916 | 9/1951 | Burroughs | 260—88.2 D |
| 2,734,892 | 2/1956 | Carter | 260—93.3 |
| 2,802,813 | 8/1957 | Maguire | 260—93.3 |
| 3,413,246 | 11/1968 | Weymann | 260—4 |
| 3,466,267 | 9/1969 | Derfer | 260—80.7 |
| 3,467,632 | 9/1969 | Davis | 260—80.7 |

OTHER REFERENCES

Kirk-Othmer: Encylopedia of Chemical Technology, vol. 19, p. 834, "Terpenes and Terpenoids."

JOSEPH L. SCHOFER, Primary Examiner

R. S. BENJAMIN, Assistant Examiner

U.S. Cl. X.R.

260—93.3